UNITED STATES PATENT OFFICE.

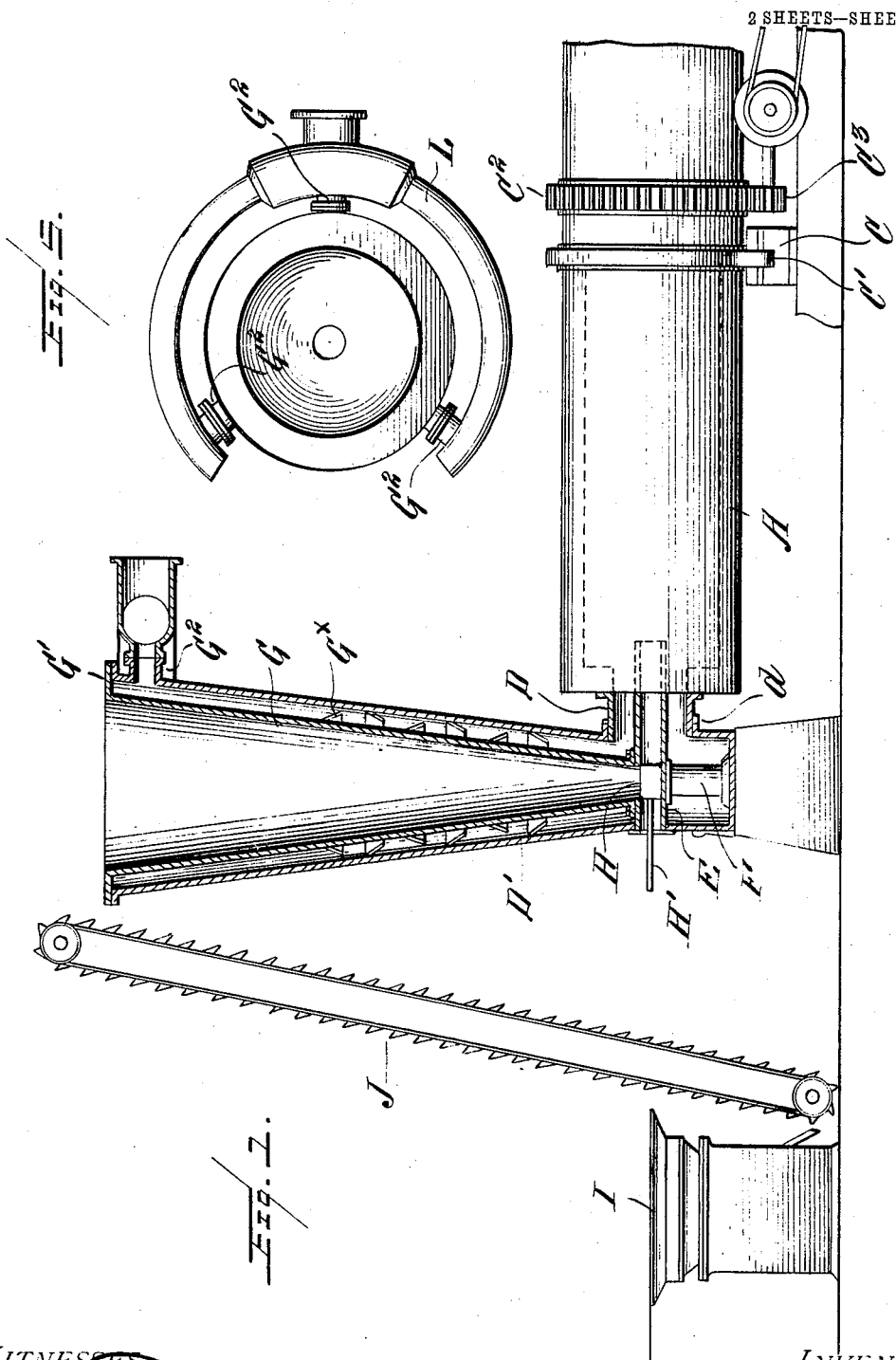

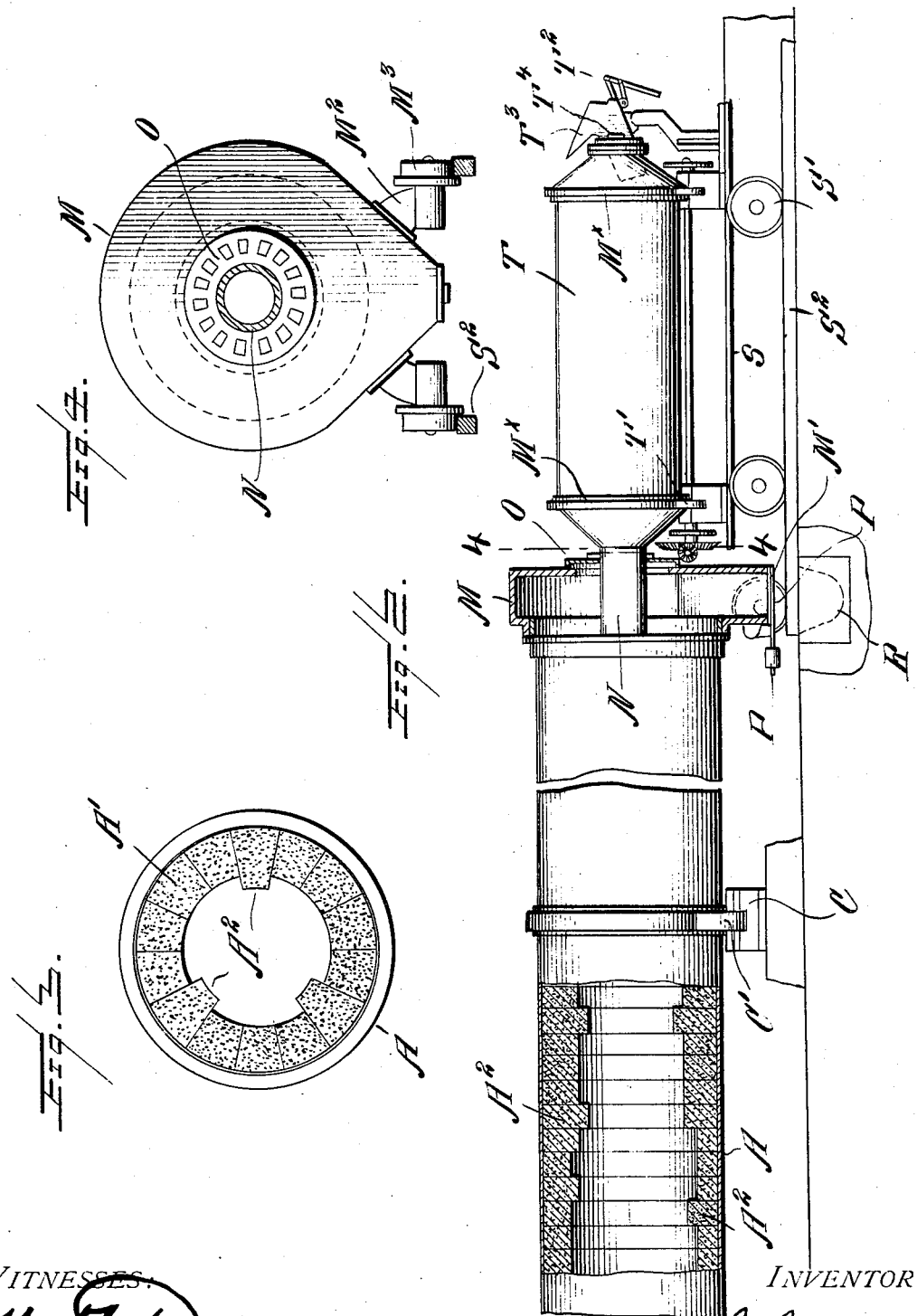

JOHN G. JONES, OF CARTHAGE, NEW YORK.

PROCESS OF MAKING SULFUR DIOXID.

No. 872,822.   Specification of Letters Patent.   Patented Dec. 3, 1907.

Application filed May 11, 1907. Serial No. 373,093.

*To all whom it may concern:*

Be it known that I, JOHN G. JONES, a citizen of the United States, residing at Carthage, in the county of Jefferson and State of New York, have invented certain new and useful Improvements in Processes for Making $SO_2$ Gas from Sulfur-Bearing Ores; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful processes for producing sulfur gas ($SO_2$) from sulfur bearing ores, especially from iron pyrites, and consists essentially in the introduction into a rotary kiln, in which sulfur bearing ores are being roasted, of $SO_2$ gas produced by burning commercial sulfur in an auxiliary burner, thereby enriching the gas given off from the sulfur bearing ores.

The invention consists further in the process of causing crushed sulfur bearing ore to pass through a hopper surrounded by a heat dust chamber, whereby the fresh ore may absorb heat before entering a rotary kiln in which, as it is fed forward, it absorbs heat from the $SO_2$ gas which is given off from the ore in the burning zone of the kiln and, becoming highly heated in consequence thereof, is prepared to give off its $SO_2$ gas readily when it reaches the burning zone.

The invention consists further in various steps of the process which may be carried out by the employment of an apparatus which will be hereinafter fully described.

I illustrate my apparatus in the accompanying drawings, which, with the letters of reference marked thereon, form a part of my invention, and in which:—

Figure 1 is a vertical sectional view through a portion of an apparatus utilized in carrying out my process, portions being shown in elevation. Fig. 2 is a sectional view through a portion of the rotary kiln showing a commercial sulfur burning kiln in elevation and connected thereto. Fig. 3 is a cross sectional view through the rotary ore burning kiln. Fig. 4 is a sectional view on line 4—4 of Fig. 2 and Fig. 5 is a top plan view of the hopper and dust chamber, shown in Fig. 1.

Reference now being had to the details of the drawings by letter, A designates a rotary kiln having a suitable lining of brick, certain blocks of which are designated by letters $A^2$ and which project beyond the others and spaced apart, and provided to afford means for thoroughly agitating the sulfur bearing ore as it is fed through the kiln. The kiln is mounted upon suitable piers C carrying anti-friction rollers C' on which the kiln directly rests. About the circumference of the kiln are series of gear teeth $C^2$ with which a pinion $C^3$ meshes for rotating the kiln.

One end of the rotary kiln has fixed thereto a nipple D which extends through an opening in the wall D' of the dust chamber, said opening being provided with a flange $d$ forming a bearing for the nipple as it rotates therein. Passing transversely through the lower portion of the dust chamber is a feed pipe E extending centrally into said kiln, as shown clearly in Fig. 1 of the drawings. A supporting pier or post F rests upon the bottom of the dust chamber and supports said feed pipe and, fixed to said feed pipe, is a tapering hopper G which is surrounded by the dust chamber and has a flange G' at its upper end resting upon a flange of the dust chamber. Projecting in alternate relations with one another from the inner surface of the dust chamber and the outer circumference of the hopper are series of alternately arranged baffles $G^\times$ designed for the purpose of detaining dust which otherwise might be drawn up through the dust chamber and make exit at the upper end thereof. The lower open end of the hopper registers with an opening formed in said feeding tube and H designates a feeding plunger adapted to reciprocate within said feed tube by any suitable means communicated to the stem H' of said plunger, whereby ore falling from the hopper into said tube may be pushed forward into the kiln which will be readily understood.

I designates an ore crusher in which the sulfur bearing ore is reduced to a suitable granular shape, from which crusher it falls into the endless conveyer J up which it is carried and deposited into the hopper. Leading from the upper portion of the dust chamber are the pipes $G^2$, shown clearly in Fig. 5 of the drawings, one of said pipes being connected at its outer end to a curved pipe L through which the gas is drawn in any suitable manner.

Said kiln A has a lining of fire brick A', certain of said brick designated by $A^2$ projecting beyond the others and serving as agitators for the purpose of lifting up and turning the ore as the kiln through which it is passing revolves slowly. At the discharge end of the kiln is a hood M in which the end of the kiln A rotates and through which the pipe N leads. A suitable register O, shown in end elevation in Fig. 4 of the drawings, is formed in said hood and adapted to control the feeding of air into the kiln for the purpose of combustion. At the lower end of the hood M is a discharge outlet M' controlled by a balanced valve P having a weight P' mounted upon one end thereof, which normally holds the valve closed and directly underneath said discharge opening in the hood M is a conveyer trough R into which the waste ore, now in an oxid state, falls and is conveyed away. The automatically operated balanced valve P, which normally closes the opening in the bottom of the hood M after the waste ore is dumped, will quickly close preventing the introduction of too much air into the kiln. The hood M is supported by means of the bracket arms $M^2$, having stub axles on which are journaled the flanged wheels $M^3$ which rest upon the tracks $S^2$. Mounted upon a suitable truck S, having wheels S' which travel upon said tracks $S^2$, is a sulfur gas producer T, which may be either rotary or stationary. In the drawings, I have shown the producer as capable of being rotated and provided with bands $M^\times$ about its circumference and which rests upon the anti-friction rollers T'. The ends of the said producer are tapering and each end communicates with the pipe N, which leads through the register and said hood and opens into the discharge end of the kiln A. At one end of said sulfur gas producer T is a feeding device, consisting of a plunger reciprocated by the stem $T^2$ whereby the commercial sulfur which enters the hopper $T^3$ may be automatically or otherwise fed into said producer T. At the outer end of said gas producer is a register $T^4$ through which air may be admitted for the purpose of combustion within said producer.

The operation of the process is, as follows:—Commercial sulfur is placed within the sulfur gas producer and ignited and the intensely heated $SO_2$ generated therein passes into the discharge end of the kiln and will heat the fire brick to a very high degree of temperature, a sufficient amount of air being admitted through the register to allow for combustion purposes. The kiln being heated sufficiently, the sulfur bearing ore, such as iron pyrites which is first crushed to a granular condition, is elevated and deposited in the hopper which is surrounded by the dust chamber. By having the ore hopper surrounded by the dust chamber through which the heated $SO_2$ gas passes, the ore within the hopper will absorb the heat from the surrounding chamber, thereby becoming heated before entering the kiln and, at the same time, the absorbing of the heat by the fresh ore reduces the temperature of the gas being drawn off by suction or otherwise from the openings at the upper end of the dust chamber. As the plunger H in the feed pipe is reciprocated, the ore will be fed into the kiln A and, by regulating the speed of the piston, the quantity fed to the kiln may be gaged very accurately to suit the requirement of the ore being roasted.

By the provision of the three gas outlet openings in the dust chamber, the circulation of the $SO_2$ gas around the ore hopper may be made positive, thus insuring uniformly heated ore before it passes into the rotary kiln to be further treated. As the ore is introduced into the kiln A, the slow rotary movement of the latter will cause the ore to be fed forward by gravity, partly due to the pitch of the kiln and partly to the rotary movement of the same. The agitator brick which projects from the lining of the kiln will serve to stir the ore and constantly bring fresh surface in contact with the $SO_2$ gas. As the ore is slowly fed forward, it will absorb heat from the $SO_2$ gas which is given off from the ore in the burning zone of the kiln, becomes highly heated in consequence thereof and is made ready to give off its $SO_2$ gas when it reaches the burning zone.

It will be understood that as the sulfur gas $SO_2$ is formed in the burning zone of the kiln, it is enriched by the $SO_2$ gas produced by burning commercial sulfur in the sulfur gas producer, the combined gases being drawn through the rotary kiln and imparting heat to the incoming sulfur ore which has already been partially heated by the radiating of heat from the dust chamber. As the gases laden with dust pass through the dust chamber, the dust will be precipitated in the lower portion of the chamber by coming in contact with the alternate arranged baffles arranged upon the adjacent walls of the dust chamber and the hopper in which the ore is deposited and may be readily withdrawn from the lower portion of said chamber. By making the joints air tight, the quantity of air may be measured to meet the necessary requirements for combustion.

Heretofore in producing sulfur gas, expensive apparatus has been utilized, requiring the ore to be treated to be first reduced to a concentrated state, but by my process, the apparatus employed is inexpensive, simple in construction, and the $SO_2$ gas may be extracted from the sulfur bearing ores in their natural state, this being made possible by means of the high temperature of the $SO^2$ gas in the producer M, by burning common commercial sulfur and making it assist in burning the sulfur bearing ores in the rotary kiln, which ores in their natural state, it is well known, would not furnish sufficient heat to make perfect roasting of the ore possible from the sulfur contained in the ore itself.

What I claim is:—

1. The process of making $SO_2$ which consists in burning comparatively pure sulfur and introducing sulfur dioxid produced thereby, together with a regulated quantity of air, into a kiln in which sulfid ore is being roasted, thereby enriching the gas given off from the ore being roasted, as set forth.

2. The process of making $SO_2$ which consists in burning comparatively pure sulfur and introducing the sulfur dioxid produced thereby together with a regulated quantity of air into a kiln in which sulfid ore is being roasted, thereby enriching the gas given off from the ore being roasted, and afterwards separating the dust from the kiln and withdrawing the gas therefrom, as set forth.

3. The process of making $SO_2$ which consists in burning comparatively pure sulfur and introducing the sulfur dioxid produced thereby, together with a regulated quantity of air, into a kiln in which sulfid ore is being roasted, thereby enriching the gas given off from the ore being roasted, and afterwards separating the dust from the kiln and withdrawing the gas therefrom, the temperature of which has been reduced by imparting its heat to the incoming ore as set forth.

4. The process of making sulfur dioxid which consists in burning commercial sulfur in a suitable receptacle and introducing the relatively concentrated sulfur dioxid produced thereby at a high temperature with air into a kiln in which sulfur bearing ore is being roasted, thereby enriching the gas given off from the ore and afterwards separating the dust from the kiln and withdrawing the gas therefrom, as set forth.

5. In the process of making sulfur dioxid the steps consisting in burning commercial sulfur and introducing with air the highly heated relatively concentrated sulfur dioxid given off from the burning of the sulfur into a kiln to gradually heat up sulfur bearing ore being fed through the kiln, thereby preparing the ore for the burning zone, as set forth.

6. In the process of making sulfur dioxid the steps consisting in burning commercial sulfur and introducing with air the highly heated relatively concentrated sulfur dioxid given off by the burning of the sulfur into a kiln to gradually heat up sulfur bearing ore being fed through the kiln, thereby preparing the ore for the burning zone and enriching the sulfur dioxid given off by the ore, the heating of the fresh ore cooling the sulfur dioxid.

7. In the process of making sulfur dioxid the steps consisting in subjecting sulfur bearing ore before entering a kiln to the influence of heated sulfur dioxid, thereby cooling the latter and heating the ore and afterwards subjecting the ore in the burning zone of a kiln to air and highly heated relatively concentrated sulfur dioxid produced by burning commercial sulfur, thereby enriching the sulfur dioxid given off from the roasted ore, as set forth.

In testimony whereof I hereunto affix my signature in the presence of two witnesses.

JOHN G. JONES.

Witnesses:
  A. G. PECK,
  A. T. WOOD.